J. A. CRAMER.
Axle-Box.
No. { 869. 31,873. }
Patented Apr. 2, 1861.
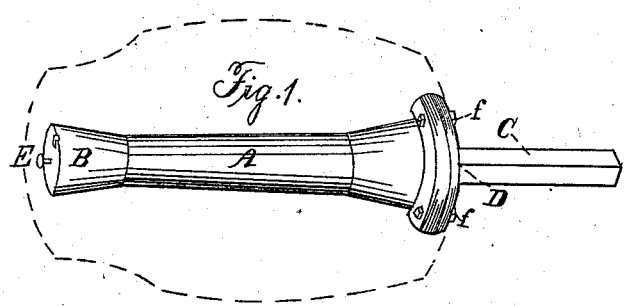
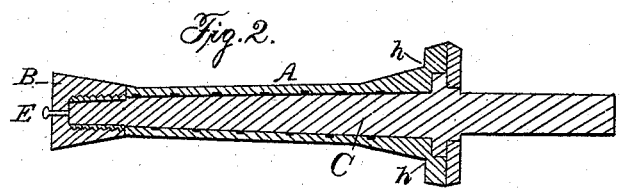
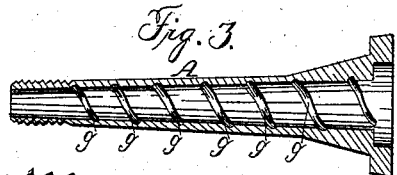

UNITED STATES PATENT OFFICE.

JAMES A. CRAMER, OF BROOKLYN, NEW YORK.

BOX FOR CARRIAGE-HUBS.

Specification of Letters Patent No. 31,873, dated April 2, 1861.

*To all whom it may concern:*

Be it known that I, JAMES A. CRAMER, of Brooklyn, in the county of Kings and State of New York, have invented a new and useful Improvement in Axle-Boxes for Carriages, and I do hereby declare that the following is a full, clear, and exact description of the same, reference being had to the accompanying drawings, making a part of this specification, in which—

Figure 1, is a perspective view, Fig. 2, a longitudinal section and Fig. 3, a section of the box, separate and apart from the axle.

The same letters indicate like parts in all the drawings.

The nature of my invention consists in the method of securing the box in the axle, which is accomplished by the use of a conical or wedge shaped nut on the end of the box, which when screwed up operates both to wedge and clamp the box in the hub.

It is well known that the present method of fastening and truing the box in the hub consists, mainly in driving wedges around the box, at the outer end. This wedge process is now in common use, and is open to the following positive objections: first, that it requires too much wood to be cut out from the center of the hub to receive the wedges, and consequently greatly weakens the hub. Second, the wedges being formed of wood and driven in by hand are necessarily more or less unequal in their actions and often unnecessarily strain the hub and so cause it to split. This is well known to be the case with light hubs especially. Third, these wooden wedges are not durable. Fourth, they sometimes become shrunken and loose, and when so, require to be replaced with new ones,—since from their nature and position they cannot be driven up or tightened. All these objections I overcome by the use of my conical or wedge nut B, Figs. 1 and 2.

In the drawing A, is the box, C, is the axle, D, a collar or flange adjusted to fit against the flange on the box A, and is screwed thereto by means of the bolts *f, f*. The heads of the bolts *f, f*, are on the hub side of the flange on A, and are somewhat sharpened and project slightly, in order to catch and hold the hub when it is pressed and clamped into position by the nut on the end of the box A.

B, is the nut on the end of A, and is formed conical or wedge shape, as represented, in order that it may enter flush with the end of the hub, and operate in a double capacity—1st to clamp the hub firmly between it and the flange at the other end of the box; 2nd to wedge itself into the hub as it is screwed up, and so to hold firm and steady the box in the hub and in connection with the wedge and pointed bolt heads at the other end of the box, to prevent any tendency whatever of the box getting loose, turning or working in the hub, at the same time being formed of metal and small in size and being entirely uniform, equal and exact in its pressure it will require but little of the hub to be cut away to receive it (thus leaving the hub firm and strong) and while both clamping and wedging thoroughly it will have no tendency beyond what is absolutely necessary to split the hub.

Should the box at any time become loose it may be tightened by simply turning the nut B. *h, h*, Fig. 2, holds the axle in position in the box.

*g, g, g, g*, Fig. 3, are grooves cut in the inner shell of the box to hold oil for lubrication, the oil being injected through the orifice in the end of B, formed by removing the screw E, Figs. 1 and 2.

It is evident that the conical wedge nut B, when made with an opening for the end of the axle through it, may be used to fasten in the hub the box of any plain or ordinary axle, equally with the box and axle described.

What I claim as new and of my own invention and desire to secure by Letters Patent of the United States is—

The conical or wedge shaped nut B, Figs. 1 and 2, on the end of the box A, for the double purpose of wedging and clamping the hub on the said box, substantially in the manner and for the purposes herein described.

JAMES A. CRAMER.

Witnesses:
JAMES WATSON CAIRNS,
JAMES E. McBETH.